Aug. 7, 1951 T. M. SABO 2,563,422
HOUSEHOLD IMPLEMENT
Filed July 26, 1947
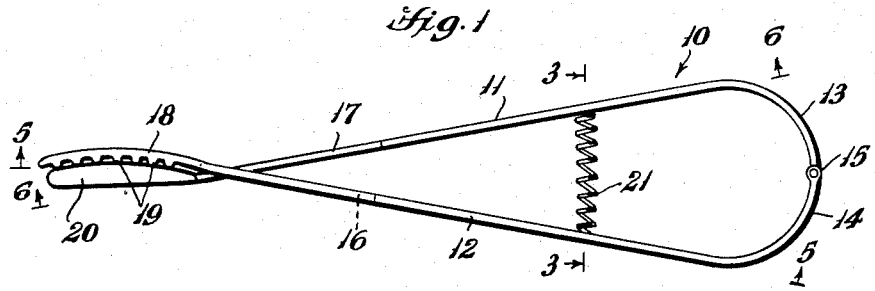
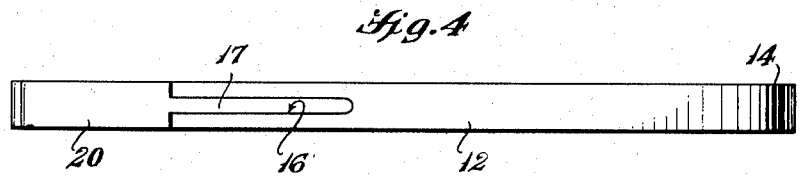
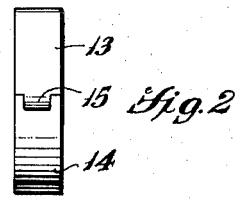
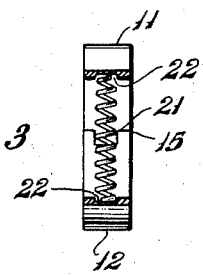
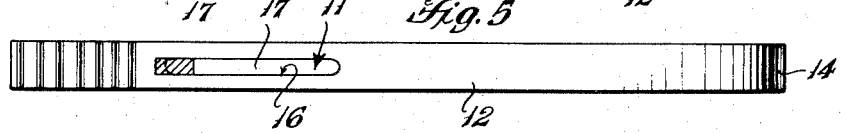
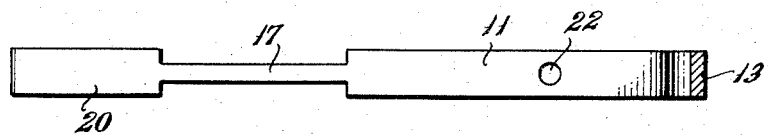
INVENTOR.
Therese M. Sabo
BY
ATTORNEY Patented Aug. 7, 1951

2,563,422

UNITED STATES PATENT OFFICE 2,563,422

HOUSEHOLD IMPLEMENT

Therese M. Sabo, Stockholm, N. J.

Application July 26, 1947, Serial No. 763,842

1 Claim. (Cl. 294—33)

This invention relates to household implements, and more particularly aims to provide a novel, practical, and useful implement for picking up dishes such as plates, cups, glasses, etc. out of the water in which they lie so that the person, particularly the housewife, need not immerse her hands in the water.

Another object of the invention is the provision of such an implement which is simple in construction and easy to use, and is at the same time inexpensive in cost of manufacture.

The above broad as well as additional and more detailed objects will become apparent in the following description, wherein characters of reference refer to like-numbered parts in the accompanying drawing. It is to be noted that the drawing is intended for the purpose of illustration only and that it is neither desired nor intended to limit the invention to any or all of the specific details of construction shown, excepting insofar as they may be deemed essential to the invention.

Referring briefly to the drawing,

Fig. 1 is a side elevational view of the implement.

Fig. 2 is a rear end elevational view of the same.

Fig. 3 is a sectional view taken on the line 3—3 of Fig. 1.

Fig. 4 is a bottom plan view of the implement.

Fig. 5 is a sectional view taken on the line 5—5 of Fig. 1.

Fig. 6 is a sectional view taken on the line 6—6 of Fig. 1.

Referring in detail to the drawing, the numeral 10 indicates the implement which is formed of two complementary sections or halves 11 and 12, whose rear ends 13 and 14 are arched substantially as shown and hinged together by a hinge 15. The section 12 has a longitudinal slot extending therethrough over a portion of its length near the forward end thereof. For substantially the same portion of its length and in substantially the same position, the section 11 has a narrowed portion 17 which extends slidably through the slot 16 at an angle thereto.

At its free extremity the section 12 is provided with a concavely arched, widened jaw 18 having transverse serrations 19 thereon. The section 11 has at its free end a complementarily convexly rounded jaw 20 adapted to register against the serrated jaw 18. A compression spring 21, has its ends registering in sockets 22 formed as recesses in the sections 11 and 12, and normally urges the jaws 18 and 20 together. To separate the jaws, the sections 11 and 12 are forced together by the fingers of one hand, in the neighborhood or forward of the spring 21, and upon release the jaws automatically clamp down upon the edge of any dish which is positioned between them.

Thus, the housewife may preserve her hands by using the implement 10 to reach under the dish water and lift out the dish for drying.

The implement is preferably made out of any suitable or well known plastic material, of which Lucite may be cited as an example.

Obviously, modifications in form and structure may be made without departing from the spirit and scope of the invention.

I claim:

An implement comprising a pair of elongated members having their rear ends arched toward each other and having a hinge joining the extremities of said arched ends, one of said members having a longitudinal slot therethrough intermediate its length, the other of said members having a portion thereof intermediate its length narrowed to a width slightly less than the width of said slot and extending slidably through said slot, said arms having a pair of aligned cylindrical recesses in the mutually opposite dies thereof positioned intermediate the distance between said slot and said hinge, the free extremities of said members having complementary jaws thereon, a coiled compression spring having the extremities thereof registering in said aligned recesses and normally urging said jaws together, one of said jaws having the inner surface thereof concave, the other of said jaws having the inner surface thereof convex, one of said jaws having transverse serrations on said inner surface thereof.

THERESE M. SABO.

REFERENCES CITED

The following references are of record in the file of this patent:

UNITED STATES PATENTS

| Number | Name | Date |
|---|---|---|
| 776,184 | Kallstrom | Nov. 29, 1904 |
| 1,224,606 | Cottrell | May 1, 1917 |
| 1,537,766 | Greene | May 12, 1925 |
| 1,546,076 | Huguley | July 14, 1925 |
| 1,779,442 | Mueller | Oct. 28, 1930 |
| 1,972,687 | McCoy | Sept. 4, 1934 |
| 2,369,872 | Vizniowski | Feb. 20, 1945 |

FOREIGN PATENTS

| Number | Country | Date |
|---|---|---|
| 589,648 | Germany | Dec. 12, 1933 |